April 1, 1952   F. W. ANDERSON ET AL   2,591,492
OVERTRAVEL CONTROL APPARATUS FOR HYDRAULICALLY
CONTROLLED AGRICULTURAL IMPLEMENTS
Filed Aug. 12, 1948   3 Sheets-Sheet 1
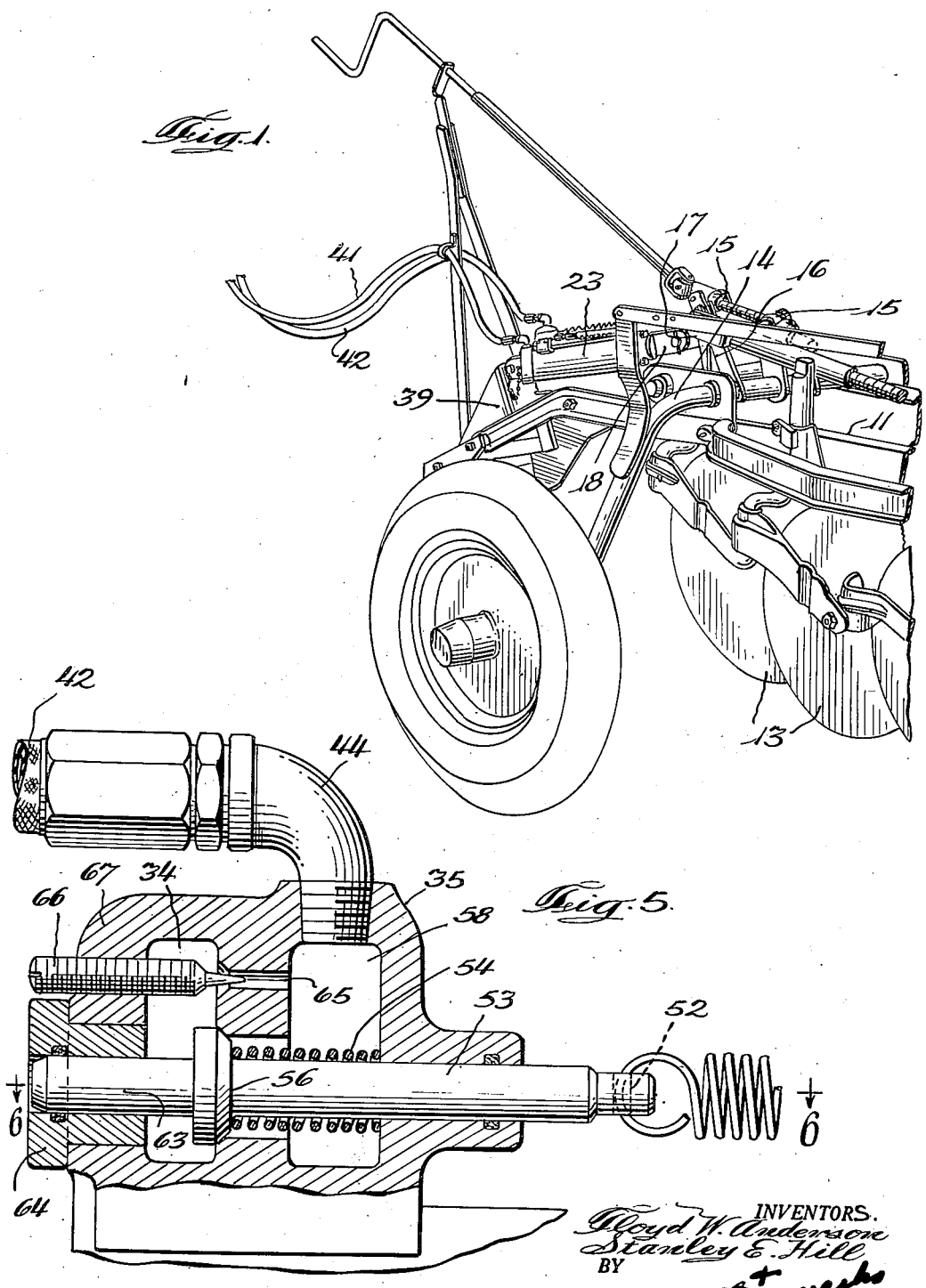

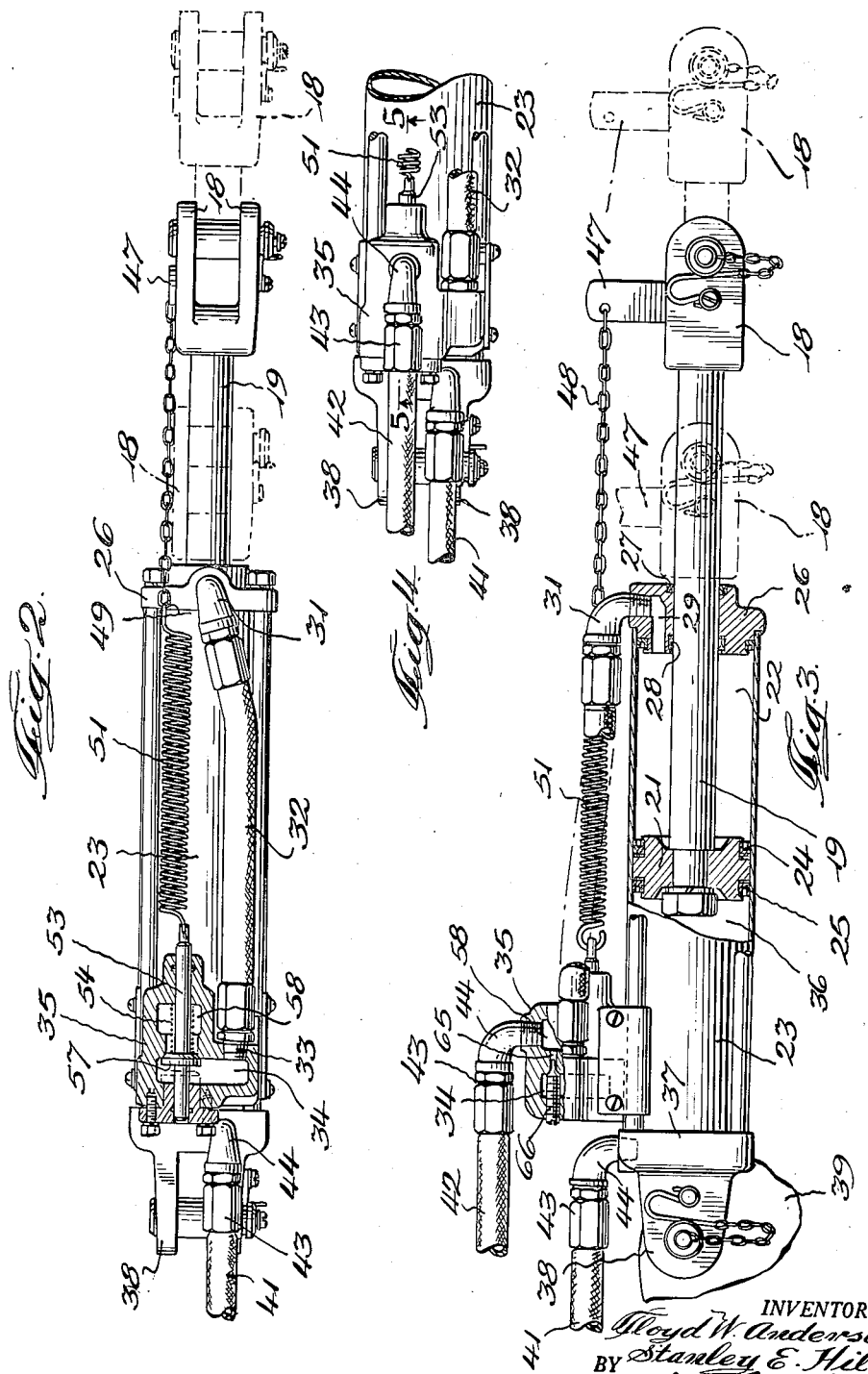

April 1, 1952    F. W. ANDERSON ET AL    2,591,492
OVERTRAVEL CONTROL APPARATUS FOR HYDRAULICALLY
CONTROLLED AGRICULTURAL IMPLEMENTS
Filed Aug. 12, 1948    3 Sheets-Sheet 3

Inventors
Lloyd W. Anderson
Stanley E. Hill
By
Attorneys

Patented Apr. 1, 1952

2,591,492

UNITED STATES PATENT OFFICE 2,591,492

OVERTRAVEL CONTROL APPARATUS FOR HYDRAULICALLY CONTROLLED AGRICULTURAL IMPLEMENTS

Floyd W. Anderson and Stanley E. Hill, Kankakee, Ill., assignors to Sears, Roebuck and Co., Chicago, Ill., a corporation of New York Application August 12, 1948, Serial No. 43,884

2 Claims. (Cl. 121—38)

The present invention relates to hydraulic operating devices and is concerned more particularly with supplementary valve apparatus for effecting overtravel in hydraulically actuated implements beyond predetermined limits.

The use of hydraulic actuating means in the lifting and regulation of various types of farm implements is coming to be widely recognized as a more facile and critically adjustable mode of practice. Power driven tractors are provided with pressure generating pumps which supply to a hydraulic fluid system the necessary power for accomplishing heavy and onerous traction and land cultivation functions. By equipping various classes of draft implements with hydraulically powered regulating means, a single operator, while seated in the driver's position of the tractor implement, may perform all or nearly all of the necessary regulatory functions in plowing, cultivating and harvesting. Further, hydraulic devices have come to be recognized as affording critical and accurate controls over various functions of farm implements such as require different adjustment to correspond with the characteristics of the terrain or other factors.

Among such land processing operations plowing and disk harrowing present grievous problems of tool adjustment. This is true because various types of soil and various moisture and temperature conditions concerning such soil effect different responses with the same physical settings. Thus, with relatively dry soil, disking and plowing may be accomplished more successfully with a steeper working angle in penetrating tools. On the other hand, in damp gummy soils there is sometimes encountered tendencies to submerge or suck under the penetrating tools so as to result in disagreeable interference with proper objectives.

Keeping in mind, therefore, that in the use of hydraulic controls for the purpose of accomplishing these and other vexing labor operations, predetermined regulatory settings as between plowing and idle travel adjustments may be inadequate to fulfill all ranges and conditions of proper operation, it is proposed herewith to provide an hydraulic regulating valve supplemented with a by-pass control which will permit a principal work cylinder piston to be extended beyond its normal stop limits, though obviously to a limited degree for the purpose of achieving nicely, supplemental supervision when special circumstances so require. Without thus providing, it has been found necessary under these special circumstances to readjust the intercoupling between the hydraulic and the mechanical implements only to have to restore the original settings when the circumstances which provoke the special regulations are no longer present.

Accordingly, it is a principal object of the present invention to provide an hydraulic control valve mechanism which will function normally to effect a range of movement in its operating piston between maximum and minimum adjustment requirements, but which will, in addition, permit overtravel beyond these limits to a limited extent when unusual circumstances require such extraordinary performance.

Other objects of the present invention are such as will appear during the course of the following detailed description and explanation of operation as well as those indicated in the hereunto appended claims.

For a more comprehensive understanding of this invention and the manner in which it may be attained, reference will now be had to the accompanying drawings and to the following detailed description in both of which similar reference characters have been employed to designate corresponding parts throughout.

In the drawings:

Fig. 1 is a fragmentary perspective view of a plow implement such as may be drawn by a combustion engine tractor and regulated from the tractor operator's seat, having applied thereto certain components of the present invention;

Fig. 2 is a plan view of a main operating piston and its housing cylinder having embodied therein certain characteristic features of the present invention;

Fig. 3 is a side elevational view with parts broken away showing the apparatus featured in Fig. 2 under various conditions of performance;

Fig. 4 is a fragmentary elevational view of a portion of the operating cylinder or housing on which the regulating valve is mounted;

Fig. 5 is an enlarged detailed sectional view taken approximately on line 5—5 of Fig. 4;

Figure 6:
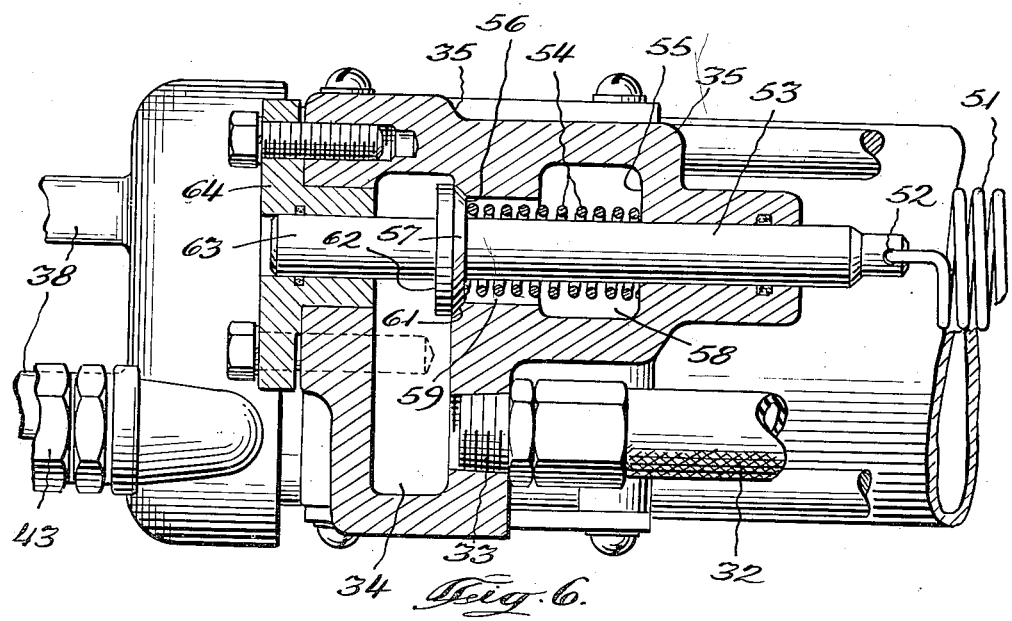
Fig. 6 is an enlarged sectional view taken approximately on line 6—6 of Fig. 5.
Figure 7:
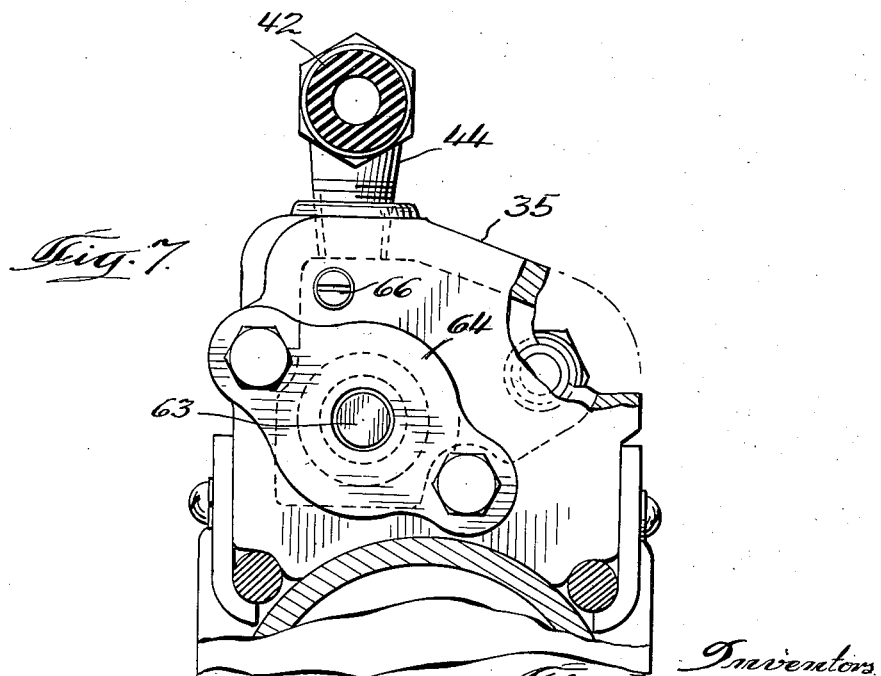
Fig. 7 is an enlarged elevational view with certain parts in section and others broken away as taken on line 7—7 of Fig. 6.

Referring now more particularly to the illustrations in the accompanying drawings, attention is directed to the reference numeral 11 which designates the principal frame member of a moldboard plow. As will be observed, the plow shares are placed one behind the other and spaced one alongside the other on each carrier frame so as to produce the well known successive earth turning and breaking operations in order to leave the soil completely turned and relatively level. A coulter disk is provided with each plow share and after the relative adjustments between these elements are established land working is thereafter regulated by positioning the gang frames simultaneously.

Depending upon the characteristics of the soil, moisture, and temperature, the height at which the plows 13 are disposed is regulated by rotating a main control shaft 14 to which the frame supporting structure is pivoted. Other shafts are made subservient to this main shaft by coupling together as through links 15. In this way, it will be understood that the position angle of shaft 14 or, in the case of other types of regulating mechanisms, a corresponding control member is critically determinative of the character of soil conditioning that will be produced.

A primary operating arm 16 through which the shaft may be angularly positioned is therefore coupled with a yoke 18, see also Figs. 2 to 4, which is secured to the remote end of a piston rod 19.

The opposite end of the piston rod 19, as will be best observed in Fig. 3, is securely bolted to a piston head 21 of cylindrical outline and proportioned to have close fitting confinement within the chamber 22 of a housing 23.

Operating fluid, which is confined in a closed pressure system coursing between a pressure generating pump that may be attached to the tractor power shaft and various entrances to the piston chamber 23, is made to drive the piston 21 forward or back and to hold this member in any intermediate position by checking the hydraulic pressure on both sides of the piston when this result is desired. In order to make the piston equally effective for both directions of travel, its periphery may be grooved so as to afford peripheral seating for the compression sealing washers 24 and 25 shown to be annular channels of resilient material so as to expand in the direction in which the fluid pressure is applied and prevent or minimize leakage thereat. In order to secure efficient and economical performance, it is advisable to equip the cylinder head 26 with suitable fluid sealing or packing devices 27 and 28 where the rod 29 passes through, as is well known in the art of hydraulic engineering. The head 26 is provided with a port 29 which communicates with the chamber 22 on the retraction side of the piston 21 and an elbow fitting 31 which is screw threaded into an embossment receptacle formed integral with the head 26 communicates through a length of conduit 32 and a nipple fitting 33 with a chamber 34, see also Figs. 5 and 6, of a valve housing 35 which is provided primarily to effect a movement checking control function and which has been supplementarily equipped to accomplish the overtravel control regulation essentially a part of the present invention.

The propulsion side of the piston designated as chamber 36 in Fig. 3 is capped with an end fitting 37 resembling the head 26 except that, instead of having the piston rod opening, capping member 37 is provided with a pair of ears 38 which straddle an anchor plate 39, a rigid upstanding protuberance integrally associated with the implement frame 11.

A communicating port in the head 37 which corresponds with port 29, but which is not illustrated in any of the figures of the drawings, supplies passage for fluid to and from the propulsion chamber 36 over a flexible conduit 41 which communicates with one side of a regulating valve situated where it may be accessible to the tractor operator. The opposite side of this valve is hydraulically in communication over a companion conduit 42 which enters the valve housing 35, as best seen in Fig. 3. Both conduits 41 and 42 are securely coupled by machined fittings 43 with elbows 44 entering their respective communication ports.

At the operator's control position, the regulating hand valve for directing fluid pressure through one and permitting it to return over the other of the two conduits 41 and 42 may be of a type well known for use in cross channel switching, so that rotation of the valve between alternative extremities of position will correspondingly introduce the conduits 41 and 42 to positive or return pressures and in varying degrees. When this valve is arrested in an intermediate position between such extremities of travel, it is contemplated that the fluid contained in the operating cylinder 23 on both sides of the piston 21 will check the travel of the piston in both directions and will hold the adjustment theretofore established.

When the piston 21 is fully retracted, which is the condition designated by one of the dotted outlines in Fig. 3 and that illustrated in Fig. 1, the shares 13 or other implements corresponding thereto, are fully raised so as to have no engagement with the soil. On the other hand, when the piston is fully extended, which is the condition shown by the solid line outline in Fig. 3, the plow shares or corresponding implements are submerged and the adjustment of these extremities of travel in relation to the piston travel is one which usually is established at the initial installation of the hydraulic controls and one which may be regulated for different types of implements by providing pluralities of coupling holes in the plate 39 at which the ears 38 are secured or in the arm 16 at which the yoke 18 is secured.

Ordinarily, and under most provocations, these extremities of travel are adequate to present soil processing implements to any position at which they may be required. Extraordinary circumstances, however, and on infrequent occasions it is deemed necessary to extend these implements beyond the penetration at which the normal limit permits them to travel. At times encountering solid objects imbedded in the earth, or during unusually dry conditions such extraordinary adjustments are made necessary, and then ofttimes but for a brief interval. It is, therefore, on such occasions advantageous to be able to extend the piston not merely to the position in which it is indicated in solid outline in Fig. 3, its normal limit of travel, but to a further extremity as permitted by the travel of piston 21 towards the cylinder head 26.

Before undertaking to explain how the piston movement is extended beyond its normal step or limit, there will first be described the normal movement arresting apparatus. Secured at one side of yoke 18 is a bar 47 having an opening which receives the end link of a chain 48 connected as at 49 to a spring 51, the opposite end of which is looped and thereat engages through a specially formed opening 52, Fig. 6, in the bypass valve stem 53.

Since the spring 51 is a distensible member and chain 48 a relaxable coupling, it will be understood that some slack will obtain in this linkage during the fully contracted or withdrawn condition of the piston such as that indicated by the first dotted outline in Fig. 3. As the piston and its rod are moved outwardly, all of the slack in the linkage is taken up and the spring 51 becomes stretched to a sufficient degree to cause it to exert a pull on the valve stem 53. In so doing spring 51 is working against a compression spring 54 which surrounds the stem 53 and is held between a shoulder 55 formed in the housing 35 and the internal surface 56 of the valve 57.

A chamber 58 within the housing 35 communicates through the valve channel 59 with the first described chamber 34 and this communication is interrupted when the valve 57 seats itself on the bevelled shoulder 61 or seat which terminates the communication channel 59.

Since the return fluid which is ejected from the chamber 22 during the expulsion cycle is transmitted through coupling 31 and flexible conduit 44 to the chamber 34 of the by-pass housing and thereafter requires to pass through the channel 59 in order to reach chamber 58 with which the return conduit 42 is connected, it will be understood that seating of the valve 57 against the shoulder 61 will prevent this fluid from escaping and hence act as a stop against the further progress of the piston head 21 in its rightward advancement as viewed in Fig. 3.

This effect is further securable due to the fact that the fluid pressure on the back surface 62 of the valve 57 maintains the valve seated against the efforts of restoration spring 54, although it is to be noted that the stem extension 63 guided as it is in the cap seal 64 reduces this holding pressure to a surface area but slightly larger than the area of surface 56 on the other side of the valve. In this way there is prevented freezing of the valve in its seat such as might result when these surface areas vary from each other widely.

Now, it is to be observed that the piston 21 has advanced to a midpoint position and that the yoke 18 has reached its normal extremity of travel as determined by the yieldable valve sealing operation exercised through the medium of expansible coil spring 51. As the pressure in chamber 34 begins to build up, a small amount of fluid is forced through a bleeder hole 65, the size of whose aperture may be critically regulated by the predetermined adjustment of a needle valve screw 66 threaded in the wall 67 of the by-pass valve housing 35.

This fluid slowly enters the chamber 58 and as a result the piston 21 is permitted to advance beyond the aforedescribed normal limit until eventually it may attain full protrusion as designated by the most extreme dotted outline position in Fig. 3. Since the orifice clearance through the regulation of needle valve screw 66 in the opening 65 may be nicely controlled, the overtravel movement of piston 21 and rod 19 is thereby made to occur at a much lower rate of speed than the original movement, so that the tractor operator need not be concerned with hair splitting accuracy in the manipulation of his regulating valve.

Under such circumstances when it becomes desirable to invoke the special purpose overtravel, the rate of such operation having been in advance determined by the setting of the needle valve screw 66, the operator needs only to permit the valve to remain in the piston protrusion position until the implement is projected to the desired extent.

While the present invention has been explained and described in accordance with a specific embodiment and portrayal, it is to be understood nevertheless that numerous modifications and variations may be instituted without departing from the essential inventive concept. It is accordingly not intended to be limited by the particular illustrations in the accompanying drawings nor by the language employed in the foregoing description except as indicated in the hereunto appended claims.

The invention claimed is:

1. In a closed circuit hydraulic control system, a main housing for containing a reciprocable piston comprising a principal chamber which communicates at a rear end of said housing with a piston projecting fluid conduit and at a fore end with a piston retracting fluid conduit, a piston contained in said main housing having an axial rod which extends through a forward cap of said housing and carries a work performing connection and a resilient valve operating linkage, a valve housing auxiliary to said main housing affording a first chamber in communication with said piston retracting fluid conduit and a second chamber in communication with a reversible source of fluid pressure, a partition separating said valve housing chambers having a valvular orifice and a bleeder orifice therethrough in communication with said chambers, a seat valve carried upon a longitudinally slideable stem sealing said valvular orifice and seated on said first chamber side of said partition, a spring on said stem urging said valve towards its open position, a coil spring comprising part of said resilient valve operating linkage capable of overpowering said valve return spring for thereby urging said valve into its closed position when said piston and its rod are projected beyond a predetermined degree, and journal bushings in said valve housing receiving said slideable stem at extremities of said chambers for thereby approximately balancing the surface areas of said seat valve for the purpose of rendering its slideable movement independent of hydraulic pressures in said chambers.

2. The combination set forth in claim 1 in which said bleeder orifice is adjustably restrictable by a needle valve screw passing through an outer wall of said valve housing first chamber and directing its needle point into said bleeder orifice for variably adjusting the orifice area.

FLOYD W. ANDERSON.
STANLEY E. HILL.

REFERENCES CITED

The following references are of record in the file of this patent:

UNITED STATES PATENTS

| Number | Name | Date |
|---|---|---|
| 1,132,203 | Matthews | Mar. 16, 1915 |
| 1,957,697 | Conway | May 8, 1934 |
| 2,063,414 | Tweddell | Dec. 8, 1936 |
| 2,220,920 | Stratton | Nov. 12, 1940 |
| 2,246,379 | Muir | June 17, 1941 |
| 2,383,689 | Silver | Aug. 28, 1945 |